J. GAYNOR.
RESILIENT VEHICLE WHEEL.
APPLICATION FILED MAR. 26, 1909.
969,266.
Patented Sept. 6, 1910.
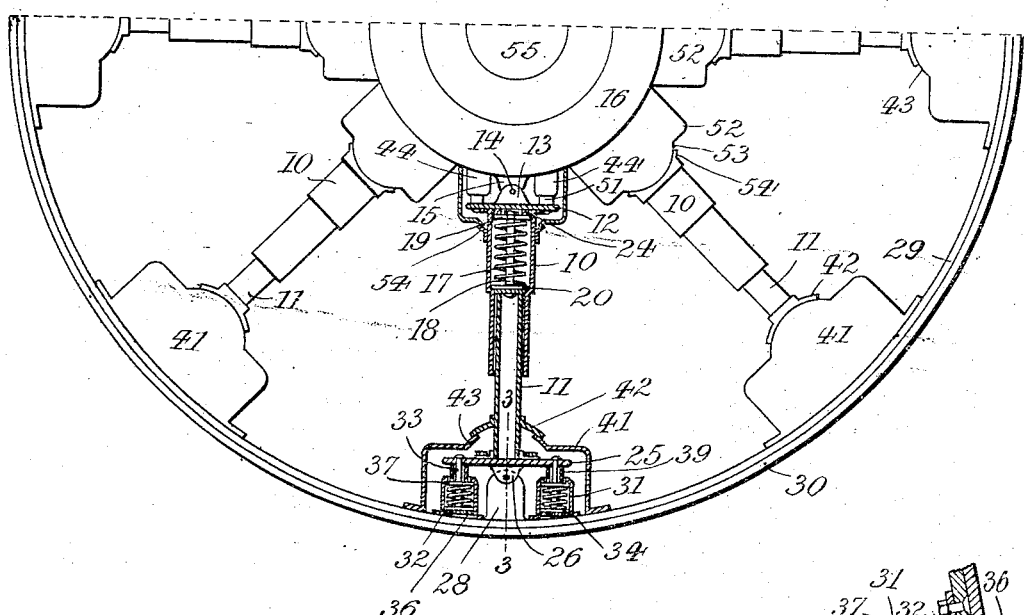
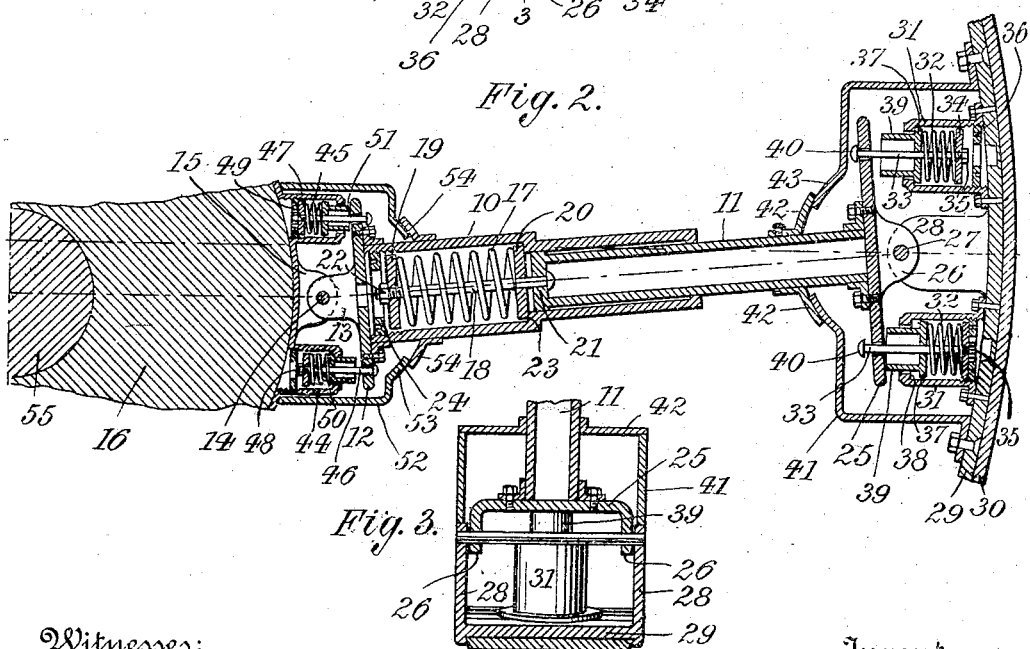

UNITED STATES PATENT OFFICE.

JOSEPH GAYNOR, OF NEW YORK, N. Y.

RESILIENT VEHICLE-WHEEL.

969,266.  Specification of Letters Patent.  Patented Sept. 6, 1910.

Application filed March 26, 1909. Serial No. 485,874.

*To all whom it may concern:*

Be it known that I, JOSEPH GAYNOR, a citizen of the United States, and a resident of New York city, Brooklyn, county of Kings, State of New York, have invented new and useful Improvements in Resilient Vehicle-Wheels, of which the following is a specification.

This invention relates to a resilient vehicle wheel which is so constructed as to effectively absorb shocks and vibrations, and thus insure a light and even running.

In the accompanying drawing: Figure 1 is a side view, partly in section of the lower half of a vehicle wheel embodying my invention; Fig. 2 is an enlarged section through one of the spokes and adjoining parts, showing the spoke tilted, and Fig. 3 an enlarged section on line 3—3, Fig. 1.

Each spoke is composed essentially of a cylinder 10 telescoping a plunger 11. Cylinder 10 is provided with an inner cross arm 12 having lugs 13 which are pivotally connected at 14 to lugs 15 projecting radially from hub 16. Within cylinder 10 is contained a spiral main spring 17 encircling a pin 18 and abutting against a pair of disks 19, 20. The outer headed end of pin 18 passes loosely through a perforated head 21 of plunger 11. The inner threaded end of pin 18 carries a nut 22 bearing against disk 19, so that by turning the nut the tension of the spring may be adjusted. Outer disk 20 engages a shoulder 23 of cylinder 10, while inner disk 19 normally rests against a threaded ring 24 tapped into the inner threaded end of cylinder 10.

Plunger 11 is provided at its outer end with an outer cross arm 25 having lugs 26 which are pivoted at 27 to lugs 28 that project inwardly from the wheel rim 29, said rim being provided, preferably, with a rubber tread 30. To the right and left of lugs 28, there are mounted on rim 29, a pair of outer cylinders 31 containing auxiliary springs 32 that encompass pins 33. The outer ends of springs 32 engage outer perforated disks 34 and carry nuts 35 that bear against said disks. Threaded rings 36 tapped into the outer threaded ends of cylinders 31 may be tightened up against disks 34. The inner ends of springs 32 engage inner perforated disks 37 adapted to abut against shoulders 38 of cylinders 31. Disks 37 are made integral with tubular sleeves 39 that project beyond cylinders 31 and are placed opposite the ends of arm 25. Pins 33 pass loosely through the perforated ends of arm 25 to which they are held by heads 40. An outer casing 41 incloses cylinders 31 and the outer end of plunger 11, the latter being provided with curved shields 42 projecting over correspondingly curved flanges 43 of casing 41.

From hub 16 extend outwardly at each side of pivots 14, inner cylinders 44 constructed in all material respects like cylinders 31. That is to say, each cylinder 44 contains an auxiliary spring 45, a headed pin 46, inner disk 47, nut 48, threaded ring 49, and outer disk 50 having tubular projections 51, and pins 46 passing loosely through cross arm 12 of cylinder 10. Cylinders 44 are inclosed by a casing 52 secured to hub 16 and having curved flanges 53 that are overlapped by correspondingly curved shields 54 of cylinder 10.

In assembling the parts, the tension desired is given to springs 17, 32 and 45, by turning nuts 22, 35 and 48, after which rings 24, 36 and 49 are screwed up to contact with disks 19, 34 and 47, and thereby prevent dead motion during the operation of the device.

During travel, the vibrations imparted to axle 55 will cause a sagging of the latter relatively to rim 29. In this way the lower spokes of the wheel will be shortened, while the upper spokes will be simultaneously lengthened, so as to compress the main springs 17 of all the spokes and thereby absorb the shock. During this operation, the temporarily vertically positioned spokes will assume a radial position to the axle, while all the other spokes will be more or less deflected therefrom. Thus with the lower vertical spoke, the main spring will be compressed owing to the descent of disk 19, while in the upper vertical spoke, the main spring will also be compressed by the descent of disk 20. With these two vertical spokes, the auxiliary springs 32, 45 will constitute balancing devices only. With all the deflected spokes, however, the arms 25 and 12 will be tilted to cause a simultaneous compression of the four outer and inner auxiliary springs 32, 45 of each spoke, which thus assist springs 17 in absorbing the jolts and jars.

It will be seen that with my improved construction all the springs of the wheel are in constant action, so that a light, even running of the vehicle is insured.

I claim:

1. A vehicle wheel comprising a rim, a relatively movable hub, plungers pivoted to the rim and having outer cross arms, main cylinders pivoted to the hub, springs within the main cylinders, a pair of outer auxiliary cylinders fitted to the rim at opposite sides of the plungers, springs within said auxiliary cylinders, and means for operatively connecting said springs to the ends of the cross arms.

2. A vehicle wheel comprising a rim, a relatively movable hub, plungers pivoted to the rim, main cylinders pivoted to the hub and having inner cross arms, springs within the main cylinders, a pair of inner auxiliary cylinders fitted to the hub at opposite sides of the main cylinders, and means for operatively connecting said springs to the ends of the inner cross arms.

3. A vehicle wheel comprising a rim, a relatively movable hub, plungers pivoted to the rim and having outer cross arms, main cylinders pivoted to the hub and having inner cross arms, springs within the main cylinders, auxiliary inner and outer cylinders carried by the rim and hub, respectively, springs within said auxiliary cylinders, and means for operatively connecting said springs to the ends of the outer and inner cross arms, respectively.

4. A vehicle wheel comprising a rim, a relatively movable hub, outer spoke sections pivoted to the rim, inner spoke sections pivoted to the hub and having inner cross arms, said spoke sections comprising cylinders and plungers engaged therein, springs in the cylinders, a pair of inner auxiliary springs engaging the hub at opposite sides of the said inner spoke sections, and means for operatively connecting said springs to the ends of the inner cross arms.

Signed by me at New York city, (Manhattan,) N. Y., this 24th day of March, 1909.

JOSEPH GAYNOR.

Witnesses:
W. R. SCHULZ,
FRANK V. BRIESEN.